US012754500B2

(12) United States Patent
Izawa et al.

(10) Patent No.: US 12,754,500 B2
(45) Date of Patent: Oct. 6, 2026

(54) HEATER INCLUDING HEAT GENERATING PATTERN AND ELECTRODE HAVING CONNECTOR THEREBETWEEN

(71) Applicant: Hewlett-Packard Development Company, L.P., Spring, TX (US)

(72) Inventors: Tatsunori Izawa, Yokohama (JP); Zhehong Chen, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/120,205

(22) PCT Filed: Oct. 27, 2022

(86) PCT No.: PCT/US2022/048008
§ 371 (c)(1),
(2) Date: Apr. 10, 2025

(87) PCT Pub. No.: WO2024/091238
PCT Pub. Date: May 2, 2024

(65) Prior Publication Data

US 2026/0140468 A1 May 21, 2026

(51) Int. Cl.
*G03G 15/20* (2006.01)
*G03G 15/00* (2006.01)
*G03G 21/16* (2006.01)

(52) U.S. Cl.
CPC ..... *G03G 15/2053* (2013.01); *G03G 15/2042* (2013.01); *G03G 15/2057* (2013.01); *G03G 15/2064* (2013.01); *G03G 15/80* (2013.01); *G03G 21/1652* (2013.01); *G03G 2215/2035* (2013.01)

(58) Field of Classification Search
CPC ........... G03G 15/2053; G03G 15/2064; G03G 15/80; G03G 2215/2035; G03G 15/2057; G03G 21/1652; G03G 2215/2038; G03G 2215/2016; G03G 2221/166; G03G 15/2042
See application file for complete search history.

(56) References Cited

U.S. PATENT DOCUMENTS 5,171,969 A * 12/1992 Nishimura ......... G03G 15/2042
399/328
9,519,250 B2 12/2016 Asaka et al.
2013/0299480 A1 11/2013 Kakubari et al.
(Continued)

FOREIGN PATENT DOCUMENTS

JP 08-190293 A 7/1996
JP 08-248795 A 9/1996
(Continued)

*Primary Examiner* — Stephanie E Bloss
*Assistant Examiner* — Laura Roth
(74) *Attorney, Agent, or Firm* — Foley & Lardner LLP

(57) ABSTRACT

An example heater includes a heat generating pattern provided on a substrate and a first electrode located at a first end of the heat generating pattern. The heater further includes a plurality of second electrodes located at an opposite end of the heat generating pattern. The plurality of second electrodes are respectively spaced apart from the first electrode at a plurality of distances. A connector is located between the heat generating pattern and the first or a second electrode.

14 Claims, 15 Drawing Sheets

(56) References Cited

U.S. PATENT DOCUMENTS

| | | | | |
|---|---|---|---|---|
| 2015/0086231 | A1* | 3/2015 | Bush | G03G 15/2042 399/69 |
| 2016/0029435 | A1* | 1/2016 | Kakubari | H05B 3/22 219/216 |
| 2016/0085189 | A1* | 3/2016 | Arimoto | G03G 15/2053 399/329 |
| 2017/0013676 | A1* | 1/2017 | Aritaki | H05B 3/03 |
| 2017/0323315 | A1 | 11/2017 | Ikumi et al. | |
| 2018/0032008 | A1 | 2/2018 | Sako et al. | |
| 2020/0401067 | A1 | 12/2020 | Samei et al. | |
| 2022/0043377 | A1* | 2/2022 | Endo | G03G 15/2042 |

FOREIGN PATENT DOCUMENTS

| | | | |
|---|---|---|---|
| JP | 2008-198459 | A | 8/2008 |
| JP | 2008-299162 | A | 12/2008 |
| JP | 2010-054846 | A | 3/2010 |
| JP | 2013-238687 | A | 11/2013 |
| JP | 2017-173580 | A | 9/2017 |
| JP | 2017-204022 | A | 11/2017 |
| JP | 2017-204029 | A | 11/2017 |
| JP | 2018-017910 | A | 2/2018 |
| JP | 2018-146957 | A | 9/2018 |
| JP | 2019-078817 | A | 5/2019 |
| JP | 2019-078820 | A | 5/2019 |
| JP | 2021-006874 | A | 1/2021 |
| JP | 6818419 | B2 | 1/2021 |
| JP | 2021-096469 | A | 6/2021 |

* cited by examiner

HEATER INCLUDING HEAT GENERATING PATTERN AND ELECTRODE HAVING CONNECTOR THEREBETWEEN

BACKGROUND

An image forming apparatus using an electrophotographic method may supply toner to an electrostatic latent image formed on an image receptor to form a visible toner image on the image receptor. The toner image may be transferred to a print medium and the transferred toner image may be fused on the print medium.

A fusing process may include heating and pressing of the toner image on the printing medium. A fusing unit may include a heater and a pressurization member that are engaged with each other to form a fusing nip. The print medium, to which the toner image is transferred, may be heated and pressed while passing through the fusing nip, and the toner image may be fused on the print medium.

BRIEF DESCRIPTION OF THE DRAWINGS

Various examples will be described below by referring to the following figures.

DETAILED DESCRIPTION

Figure 1:
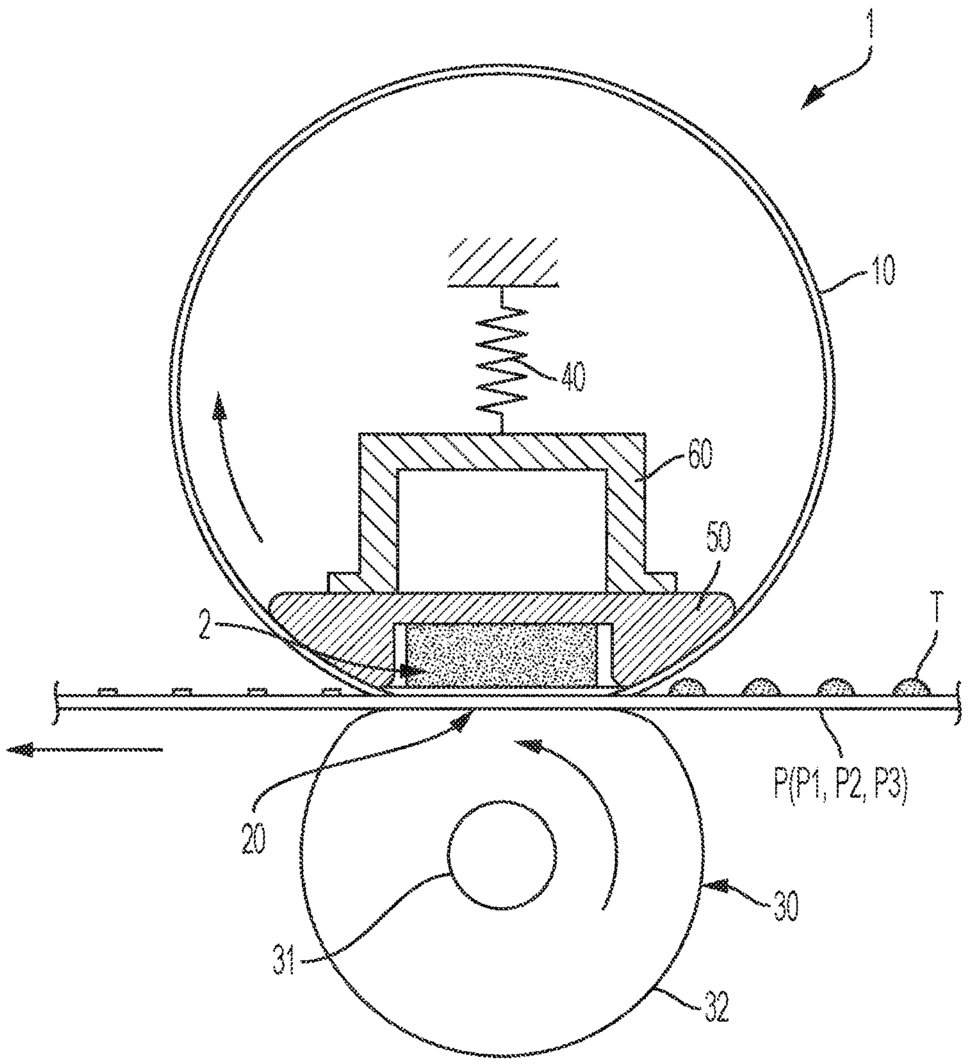
FIG. 1 is a view schematically illustrating a fusing unit according to an example.

Hereinafter, various examples will be described with reference to the drawings. Like reference numerals in the specification and the drawings denote like elements, and thus a redundant description may be omitted.

An image forming apparatus, such as a printer, a copier, a scanner, a facsimile machine, or a multi-function peripheral (MFP) that incorporates two or more of the printer, the copier, the scanner, or the facsimile machine, may use an electrophotographic method to form an image. As an example, the image forming apparatus may include a printing unit to form a visible toner image on a print medium P, for example, a sheet of paper, and a fusing unit to fuse the toner image to the print medium P.

The fusing unit may include a fusing belt, a heating element, and a backup member (e.g., a pressure roller) to contact the fusing belt. Based on the print medium P, on to which the toner image has been transferred, passing through a fusing nip region formed between the fusing belt and the pressure roller, the print medium P is heated and pressed. As a result, the toner image that is transferred on to the print medium P is fixed.

The image forming apparatus may be able to form an image on a print medium P of different sizes. In a situation in which a print medium P of a small size passes through the fusing nip region, there occurs a non-contact region where the print medium P does not contact the fusing belt. As an example, the non-contact region may be located at an end or edge of the fusing belt. Since heat is not taken away by the print medium P on the non-contact region of the fusing belt, the temperature of the non-contact region may increase excessively.

The fusing unit may include any of various arrangements such as a single heater having a pair of electrodes at opposite ends. In that case, to control a rise in temperature of a non-feed area during the fusing process, a cooling mechanism (e.g., a fan) may be used and/or a paper-feed interval may be increased. However, these cooling alternatives result in an increased cost and/or a reduction in productivity of the image forming apparatus. In other alternatives, the fusing unit may include plural heating members of different lengths that are aligned in parallel, or a plurality of heating blocks/electrodes that are controlled based on a size of the printing medium. However, these alternatives use a plurality of temperature sensors and driving circuits, which results in increased cost and complexity. Additional concerns include the size and cost based on the use of multiple heating members/sensors and a large substrate as well as heating uniformity due to gaps between heating blocks. This results in an increased cost due to the additional components of the apparatus and/or a decrease in productivity.

In an example of the present disclosure, a heater having a single heat generating pattern is provided. To generate heat, the heater includes different electrodes corresponding to different sizes of printing media. In that case, a non-feed area is not heated such that a cooling mechanism and/or a paper-feed interval increase are not of concern. The heat generating pattern can be controlled using a single sensor and a single driving circuit. This reduces costs, reduces size, and increases productivity.

FIG. 1 is a view schematically illustrating a fusing unit 1 according to an example.

Referring to FIG. 1, the fusing unit 1 may include a fusing belt 10, which is flexible, a backup member 30 that is located outside the fusing belt 10 to form a fusing nip 20 with the fusing belt 10, and a heater 2.

The heater 2 may be located inside the fusing belt 10 to heat the fusing belt 10. The backup member 30 may be located outside the fusing belt 10 to face a heater substrate (i.e., FIG. 2, heater substrate 100). A pressurization member 40 may press at least one of the heater 2 and the backup member 30. By the pressing force of the pressurization member 40, the heater 2 and the backup member 30 may press each other so that the fusing nip 20 may be formed. The heater 2 may heat the fusing belt 10 in the fusing nip 20 region so as to heat a print medium P having various widths (i.e., P1, P2, P3). Based on the print medium P having a surface on which a toner image T is formed passing through the fusing nip 20, the toner image T may be fused on the print medium P by heat and pressure.

The fusing belt 10 may include a flexible base layer (not shown). The base layer may include a thin metal layer including stainless steel, nickel, nickel-copper, or the like. The base layer may also include a polymer film, such as a polyimide film, a polyamide film, a polyimideamide film, or the like having heat resistance and wear resistance that may withstand a fusing temperature. A release layer (not shown) may be provided on a side surface or both sides of the backup member 30 of the base layer. The release layer may include a resin layer having isolation properties. The release layer may include perfluoroalkoxy (PFA), polytetrafluoroethylene (PTFE), fluorinated ethylene prophylene (FEP), or the like. In order to form a relatively wide and flat fusing nip 20, an elastic layer (not shown) may be located between the base layer and the release layer. The elastic layer (not shown) may include a material having a heat resistance to withstand the fusing temperature. For example, the elastic layer may include a rubber material such as fluorine rubber, silicone rubber, etc.

The backup member 30 may have a shape of a roller to drive the fusing belt 10 while being rotated by being pressed with respect to the heater 2 with the fusing belt 10 therebetween. For example, the backup member 30 may include a core 31 that extends in a length direction (e.g., into the page) of the backup member 30, and an elastic layer 32 on an outer periphery of the core 31. The core 31 may include, for example, a metal shaft, a metal cylinder, or the like. In an example, the elastic layer 32 may include a material such as rubber, thermoplastic elastomer, or the like. A release layer (not shown) may be included on an outer surface of the elastic layer 32. The release layer may include perfluoroalkoxy (PFA), polytetrafluoroethylene (PTFE), fluorinated ethylene prophylene (FEP), or the like.

The pressurization member 40 may provide, for example, a pressing force toward the backup member 30 to the heater 2. In an example, the pressurization member 40 may provide a pressing force to a heater holder 50 on which the heater 2 is supported, or to a pressurization bracket 60 connected to the heater holder 50. A structure for providing a pressing force to the heater 2 is not limited to the example structure shown in FIG. 1.

Figure 2:
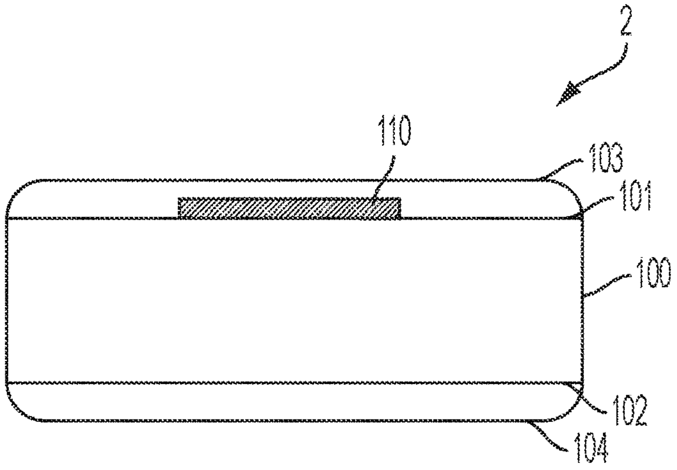
FIG. 2 is a schematic cross-sectional view of the heater 2 shown in FIG. 1 according to an example.

FIG. 2 is a schematic cross-sectional view of the heater 2 shown in FIG. 1 according to an example.

Referring to FIG. 2, the heater 2 is to heat the fusing belt 10 in the fusing nip 20. The heater 2 includes a heater substrate 100 having a first surface 101 and a second surface 102 that is an opposite surface to the first surface 101. A heat generating pattern 110 is located on the first surface 101. In the example of FIG. 2, the heat generating pattern 110 is located at a center position on the first surface 101. However, this is not to be considered as limiting a location of the heat generating pattern 110, and in other examples, the heat generating pattern 110 may be located at an off-center location, such as towards a side edge of the first surface 101. Although not shown in the cross-section of FIG. 2, the heater 2 further includes a first electrode and a plurality of second electrodes to conduct electricity to the heat generating pattern 110. An arrangement of the heat generating pattern 110 and the first electrode and plurality of second electrodes may be considered in selection of the location of the heat generating pattern 110.

The heater substrate 100 may include a thermally conductive substrate. For example, the heater substrate 100 may include a ceramic material such as alumina ($Al_2O_3$), aluminum nitride (AlN), or the like. The heat generating pattern 110 may include a metal heating material, for example, a silver (Ag)-palladium (Pd) alloy, or the like. The heater substrate 100 may be heated by heating of the heating generating pattern 110, and the temperature of the heater substrate 100 may reach a fusing temperature, for example, 80-150° C.

An electric insulating layer 103 may be provided on the first surface 101 of the heater substrate 100. The electric insulating layer 103 may cover the heat generating pattern 110, the first electrode, and the plurality of second electrodes and may function as a protective layer. The electric insulating layer 103 may be, for example, a glass layer. The second surface 102 of the heater substrate 100 may face the fusing belt 10. The second surface 102 may produce friction with the driving fusing belt 10. In order to prevent abrasion of the heater substrate 100 or abrasion of the fusing belt 10, an abrasion prevention layer 104 may be provided on the second surface 102. The abrasion prevention layer 104 may include a material having a small frictional coefficient. The abrasion prevention layer 104 may be, for example, a glass layer.

Figure 3A:
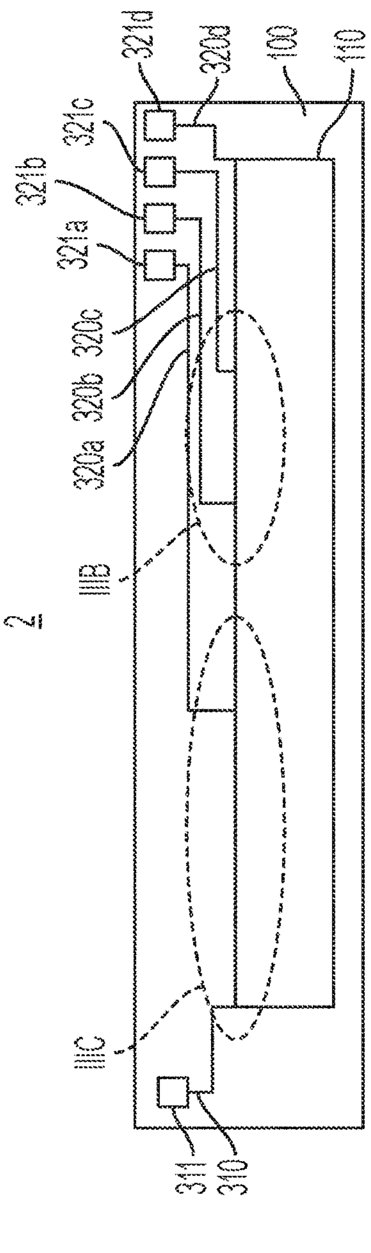
FIG. 3A is a top view of a heater including a heat generating pattern, a first electrode, and a plurality of second electrodes.

FIG. 3A is a top view of a heater including a heat generating pattern, a first electrode, and a plurality of second electrodes.

Referring to FIG. 3A, the heater 2 includes the substrate 100 having the heat generating pattern 110 located on a top surface of the substrate 100. The heater 2 includes a first electrode 310 and a plurality of second electrodes 320*a*, 320*b*, 320*c*, and 320*d*. For convenience of description, the plurality of second electrodes may be referred to as 320. The heater 2 includes a first contact 311 electrically connected to the first electrode 310. The heater 2 also includes a plurality of second contacts 321*a*, 321*b*, 321*c*, and 321*d* that are electrically connected to the plurality of second electrodes 320*a*, 320*b*, 320*c*, and 320*d*, respectively. For convenience of description, the plurality of second contacts may be referred to as 321. Although not illustrated, a power source, a switch, a controller (e.g., a processor) and the like may also be included to selectively supply power (e.g., a voltage) to the first contact 311 and the second contact 321.

The plurality of second electrodes 320 are respectively spaced apart from the first electrode 310 at a plurality of distances. In an example, the plurality of second electrodes 320 are respectively spaced apart from the first electrode 310 at a plurality of distances corresponding to different sizes of printing medium. For example, a first distance between the first electrode 310 and the second electrode 320*a* may correspond to a size (e.g., a length or a width) of a first printing medium. Similarly, a second distance between the first electrode 310 and the second electrode 320*b* may correspond to a size (e.g., a length or a width) of a second printing medium, a third distance between the first electrode 310 and the second electrode 320*c* may correspond to a size (e.g., a length or a width) of a third printing medium, and a fourth distance between the first electrode 310 and the second electrode 320*d* may correspond to a size (e.g., a length or a width) of a fourth printing medium. In an example, the fourth distance is greater than the third distance, the third distance is greater than the second distance, and the second distance is greater than the first distance.

Based on this arrangement, a voltage may be applied to the first contact 311 and selectively to one of the second plurality of contacts 321 to cause current to flow through the heat generating pattern 110 to generate heat in an area corresponding to a size of the printing medium. For example, in a case in which the third printing medium is to undergo a fusing process, a voltage may be applied to the first contact 311 and the second contact 321*c* based on the size of the third printing medium. In that example, heat is generated by the heat generating pattern 110 in the area located between the first electrode 310 and the second electrode 320*c* but heat is not generated in the area of the heat generating pattern 110 located between the second electrode 320*c* and the second electrode 320*d*.

Figure 3B:
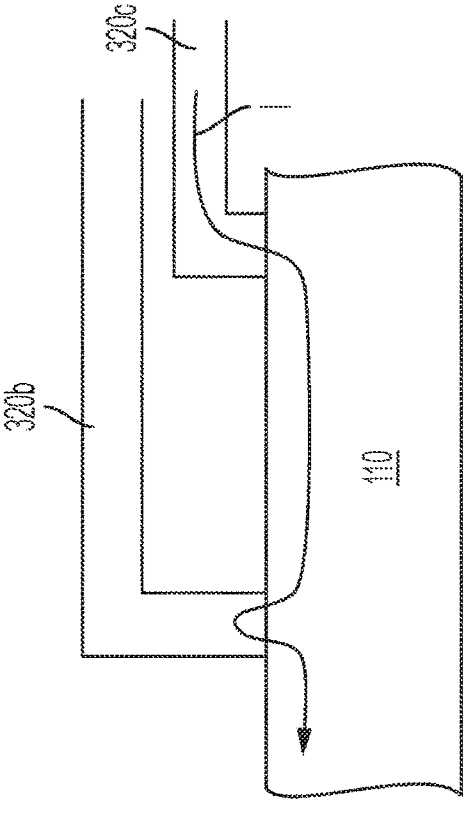
FIG. 3B is an enlarged illustration of area IIIB in FIG. 3A.

FIG. 3B is an enlarged illustration of area IIIB in FIG. 3A. As described in the example above in which the third printing medium is to undergo a fusing process, a voltage may be applied to the first contact 311 and the second contact 321*c*. In that case, a current I flows between the first electrode 310 and the second electrode 320*c*. In the example of FIG. 3B, the current I is illustrated as flowing from the second electrode 320*c* toward the first electrode 310. However, depending on a polarity of the applied voltage, the current I may flow from the first electrode 310 toward the second electrode 320*c*.

As illustrated in FIG. 3B, the current I flows through the heat generating pattern 110 to generate heat in an area corresponding to a size of the third printing medium. However, as the current I approaches an interface between the second electrode 320*b* and the heat generating pattern 110, the current I does not flow through the heat generating pattern 110 but instead flows through a portion of the second electrode 320*b*, which may be considered a bypass current path. A reason that the current I flows through the portion of the second electrode 320*b* rather than through the heat generating pattern 110 is that the second electrode 320*b* has a lower resistivity than the heat generating pattern 110. That is, because the current I will flow through a path of least resistance, and because, at the interface of the heat generating pattern 110 and the second electrode 320*b*, wherein the second electrode 320*b* includes a material having a lower resistivity than a material of the heat generating pattern 110, the current I will follow the path through the second electrode 320*b* as that path will have a lower resistance than the path through the heat generating pattern 110. Accordingly, because the current I does not flow through the heat generating pattern 110 at the interface with the second electrode 320*b*, the heat generated by the heat generating pattern 110 will be discontinuous. That is, there is little to no heat generated at the interface with the second electrode 320*b* such that the temperature of the heat generating pattern 110 is much lower at the interface with the second electrode 320*b* as compared to other areas of the heat generating pattern 110. In that case, the uneven generation of heat may cause an error in the fusing process.

Figure 3C:
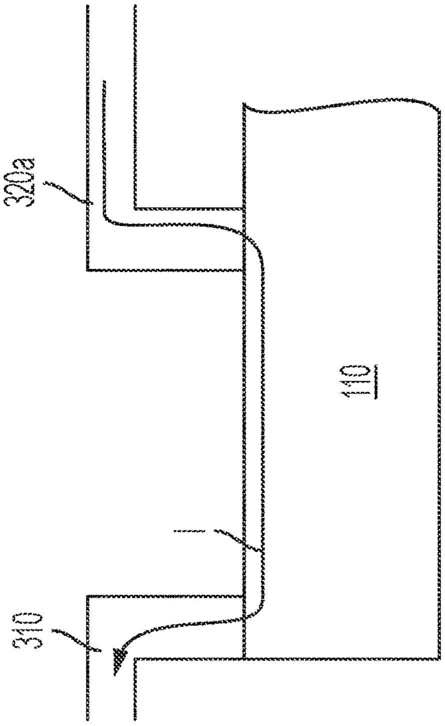
FIG. 3C is an enlarged illustration of area IIIC in FIG. 3A.

FIG. 3C is an enlarged illustration of area IIIC in FIG. 3A. In a case in which the print medium having the first size is to undergo a fusing operation, a voltage may be applied to the first contact 311 and the second contact 321*a*. In that case, a current I flows between the first electrode 310 and the second electrode 320*a*. In the example of FIG. 3C, the current I is illustrated as flowing from the second electrode 320*a* toward the first electrode 310. However, depending on a polarity of the applied voltage, the current I may flow from the first electrode 310 toward the second electrode 320*a*.

As illustrated in FIG. 3C, based on the first electrode 310 and the second electrode 320*a* being connected to a side edge of the heat generating pattern 110, the current I may flow on an edge of the heat generating pattern 110. In that case, heat generated by the heat generating pattern 110 may be insufficient (i.e., too low) to fix the toner image to the printing medium P or may be discontinuous across a width of the heat generating pattern 110, either of which may cause an error in the fusing process.

In an example of the present disclosure, a connector is provided between a heat generating pattern and a first or a second electrode. The connector is to prevent a current I from flowing through the first or the second electrode such that the current flows through the heat generating pattern in a continuous manner. In another example of the present disclosure, the first or the second electrode has a configuration that extends between side edges of the heat generating pattern, and in a further example of the present disclosure, the first or the second electrode has a configuration that that extends between and covers side edges of the heat generating pattern. A purpose of such a configuration is to improve the uniformity of heat generated by the heat generating pattern across a width of the heat generating pattern.

Figure 4A:
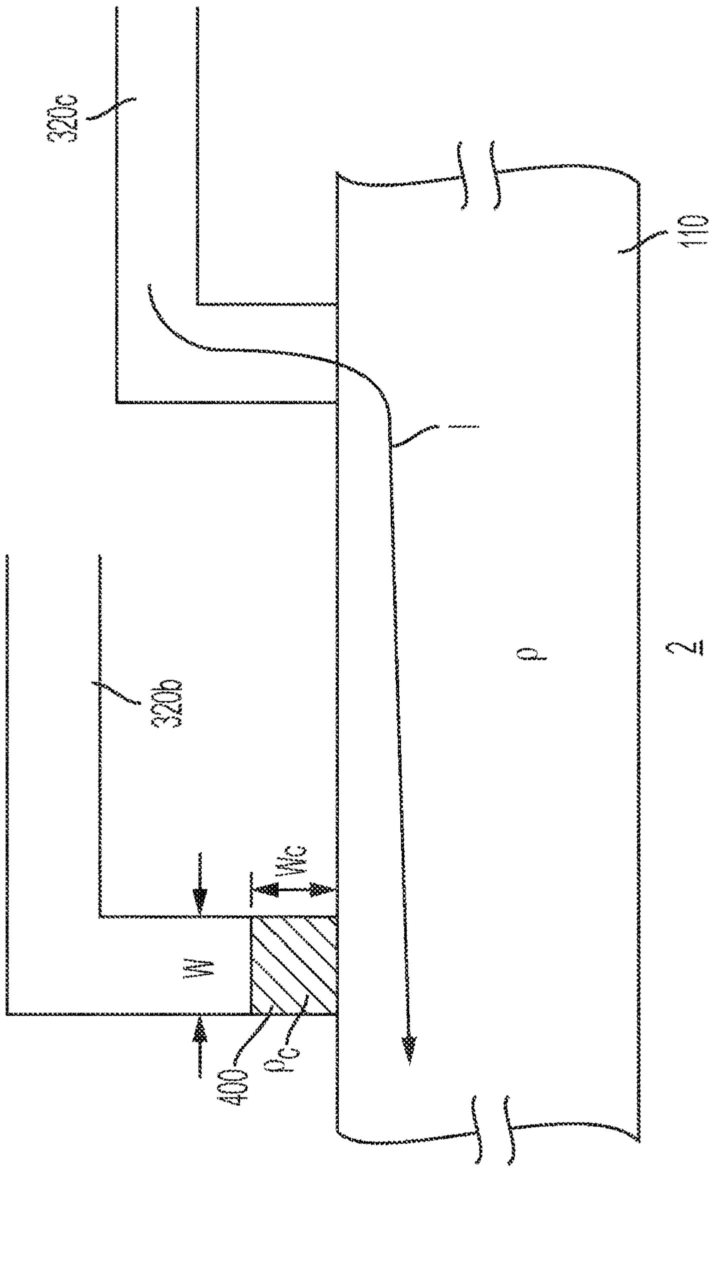
FIG. 4A illustrates a top view of a connector provided between a heat generating pattern and an electrode, according to an example.

FIG. 4A illustrates a top view of a connector provided between a heat generating pattern and an electrode, according to an example.

Referring to FIG. 4A, a heater 2 includes a heat generating pattern 110. In the illustrated example of FIG. 4A, the heater 2 includes a second electrode 320*b* and a second electrode 320*c*. The heater 2 also includes a connector 400 provided between the heat generating pattern 110 and the second electrode 320*b*. It is to be understood that a connector 400 may be located between the second electrode 320*c* and the heat generating pattern 110. Also, although not illustrated in FIG. 4A, it is to be understood that a connector 400 may be located between the first electrode 310 and others of the second electrode 320.

The connector 400 is to provide an electrical connection between the heat generating pattern 110 and the second electrode 320*b*. For example, based on a fusing operation to be performed using the second electrode 320*b*, a voltage may be applied to a second contact 321*b* and a first contact 311 such that a current flows through the first contact 311, the second contact 321*b*, the first electrode 310, the second electrode 320*b*, the connector 400, and the heat generating pattern 110.

As will be explained in more detail below with reference to FIG. 5, the connector 400 is to provide a path having a higher resistance as compared to a path in the heat generating pattern 110. In that case, a current I that is to flow thorough the heat generating pattern 110 to generate heat will be maintained in the heat generating pattern without flowing through the second electrode 320*b*.

In the example of FIG. 4A, the connector has a rectangular form. However, in other examples, the connector may have another form such as a triangular form, or a form having a meandering border. In the rectangular form of FIG. 4A, the connector 400 has a first dimension Wc that corresponds to a distance between a side edge of the heat generating pattern 110 and the second electrode 320*b* and a second dimension W that corresponds to a width of the second electrode 320*b*. A material of the connector 400 has a resistivity of $\rho_c$ and a material of the heat generating pattern 110 has a resistivity of $\rho$. Based on selected values of W, $\rho$, Wc, and $\rho_c$, the current I can be maintained in the heat generating pattern without flowing through the second electrode 320*b*. In that case, discontinuous heating along the heat generating pattern 110 may be reduced or prevented such that errors in the fusing process may be reduced or eliminated.

Figure 4B:
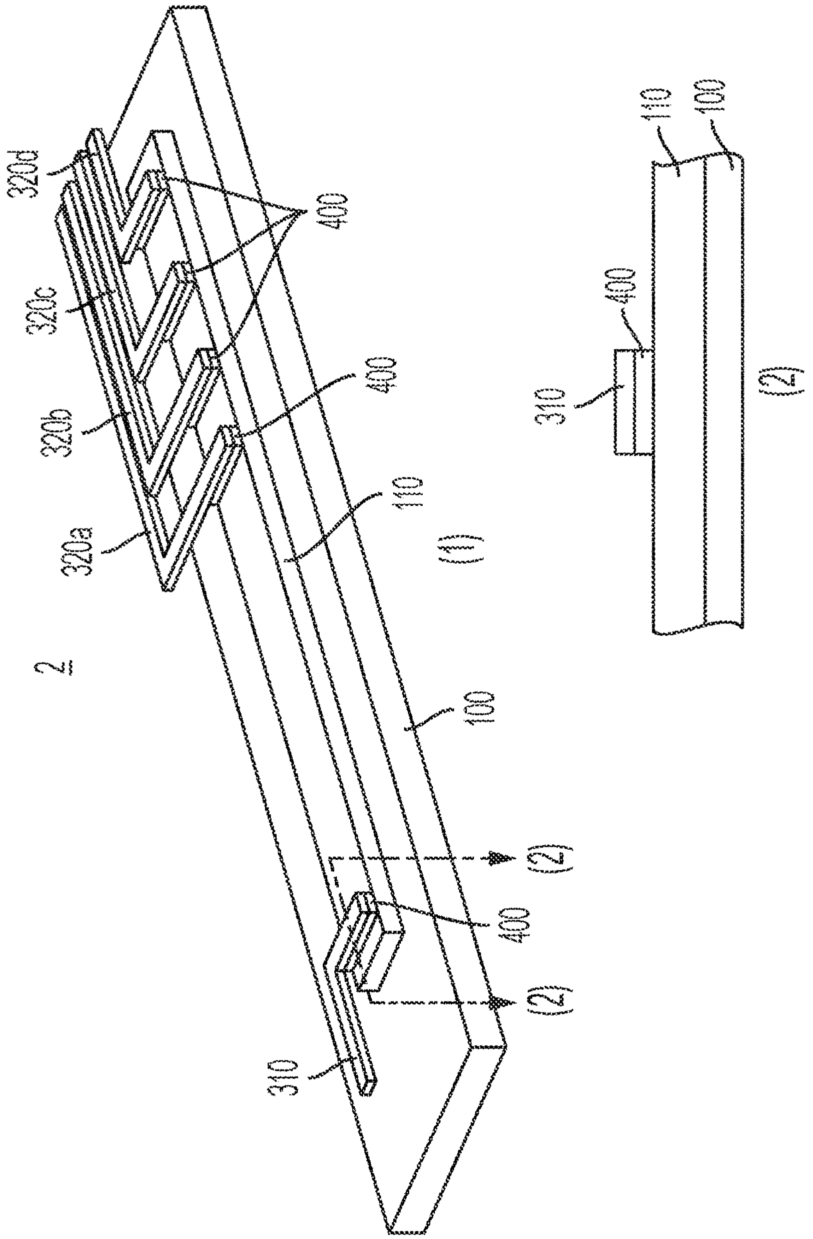
FIG. 4B illustrates a perspective view and a side view of an electrode provided across a top surface of a heat generating pattern and having a connector between the electrode and the heat generating pattern, according to an example.

FIG. 4B illustrates a perspective view and a side view of an electrode provided across a top surface of a heat generating pattern and having a connector between the electrode and the heat generating pattern, according to an example.

Referring to FIG. 4B, a heater 2 includes a heat generating pattern 110 located on a top surface of a substrate 100. The heater 2 includes a first electrode 310, and a plurality of second electrodes 320*a*, 320*b*, 320*c*, and 320*d*. The heater 2 also includes a connector 400 provided between the heat generating pattern 110 and each of the first electrode 310 and the second electrode 320. The connector 400 is to provide an electrical connection between the heat generating pattern 110 and the first and second electrodes 310 and 320. For example, based on a fusing operation to be performed using the second electrode 320*a*, a voltage may be applied to a second contact 321*a* and a first contact 311 such that a current flows through the first contact 311, the second contact 321*a*, the first electrode 310, the second electrode 320*a*, the connectors 400, and the heat generating pattern 110.

In the illustrated example of FIG. 4B, each of the first electrode 310 and the second electrodes 320, as well as the connector 400, has a configuration that extends across a width of the heat generating pattern 110. That is, the first electrode 310, the second electrode 320, and the connector 400 extends between side edges of the heat generating pattern 110. By extending the first electrode 310, the second electrode 320, and the connector 400 across a width of the heat generating pattern 110, a current that is provided to the heat generating pattern 110 may be uniformly distributed across the width of the heat generating pattern 110. In that case, errors in the fusing process may be reduced or eliminated.

Figure 4C:
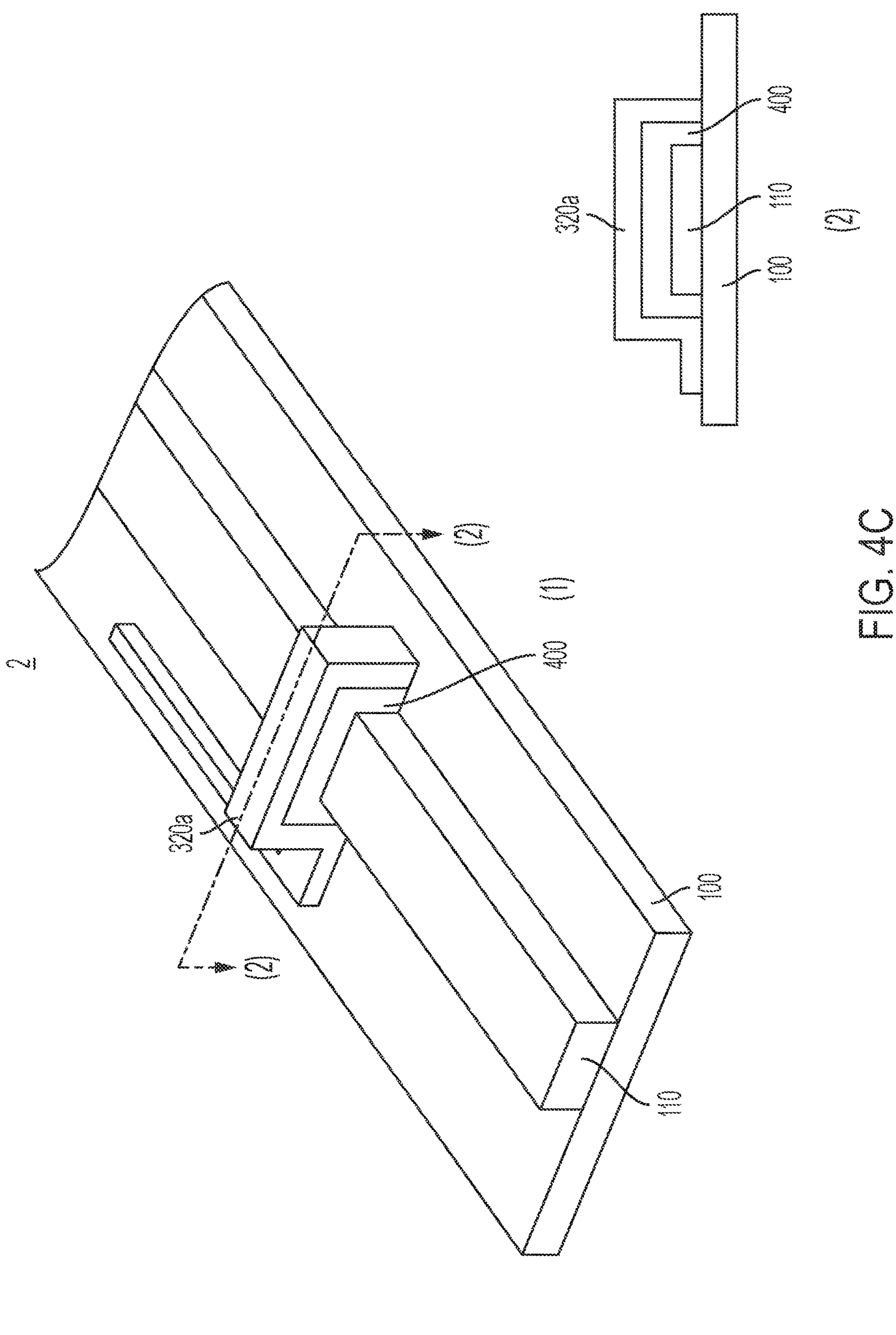
FIG. 4C illustrates a perspective view and a side view of a connector and an electrode extending across a top surface and side surfaces of a heat generating pattern, according to an example.

FIG. 4C illustrates a perspective view and a side view of a connector and an electrode extending across a top surface and sides surfaces of a heat generating pattern, according to an example.

Referring to FIG. 4C, a heater 2 includes a heat generating pattern 110 located on a top surface of a substrate 100. The heater 2 is illustrated as including a second electrode 320*a*. However, the heater 2 may further include a first electrode 310 and a plurality of second electrodes 320. The heater 2 includes a connector 400 provided between the heat generating pattern 110 and the second electrode 320*a*. The connector 400 is to provide an electrical connection between the heat generating pattern 110 and the second electrode 320*a* such that a current may flow between the second electrode 320*a* and the heat generating pattern 110. In other examples, the connector 400 may be provided between the heat generating pattern 110 and any of the first electrode 310 or the second electrodes 320.

In the illustrated example of FIG. 4C, the second electrode 320*a* and the connector 400 each has a configuration that extends across a top of the heat generating pattern 110 as well as extends down the sides of the heat generating pattern 110 towards the substrate 100. That is, the connector 400 has a configuration so as to surround a periphery of the heat generating pattern 110 that is located above the substrate 100. Similarly, the second electrode 320*a* has a configuration that is layered above the connector 400 such that the second electrode 320*a* extends across the top of the heat generating pattern 110 and down the sides of the heat generating pattern 110 towards the substrate 100 having the connector 400 located therebetween. By extending the second electrode 320*a* and the connector 400 across a top surface and down the sides of the heat generating pattern 110, a current provided to the heat generating pattern 110 may be uniformly distributed across the width and height of the heat generating pattern 110. In that case, errors in the fusing process may be reduced or eliminated.

Figure 4D:
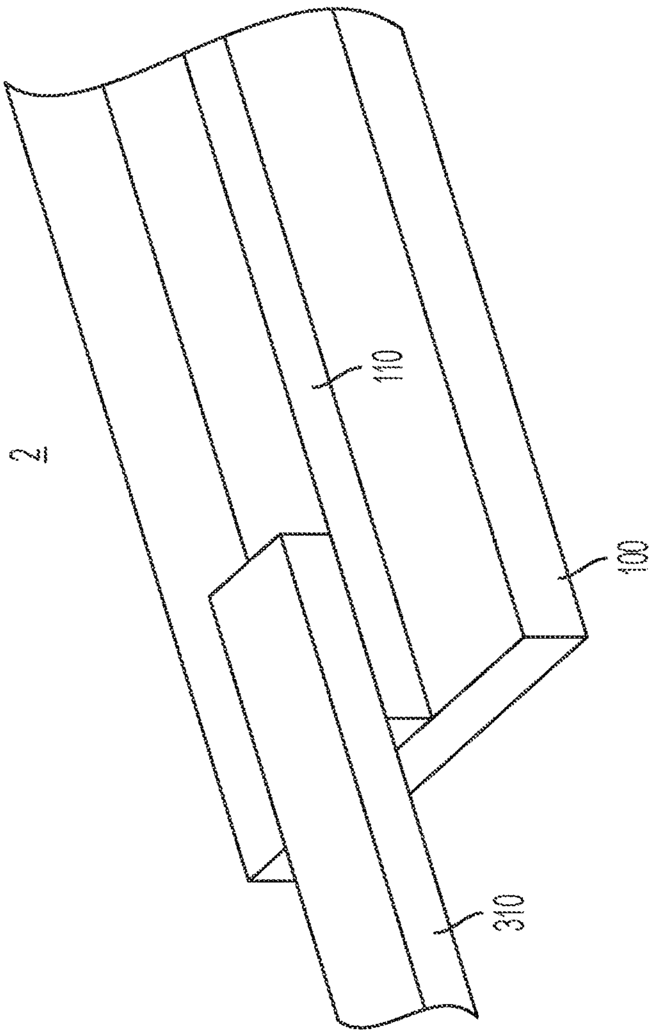
FIG. 4D illustrates a perspective view of an electrode provided across a top surface at an end of a heat generating pattern, according to an example.

FIG. 4D illustrates a perspective view of an electrode provided across a top surface at an end of a heat generating pattern, according to an example.

Referring to FIG. 4D, a heater 2 includes a heat generating pattern 110 located on a top surface of a substrate 100. The heater 2 is illustrated as including a first electrode 310. However, the heater 2 may further include a plurality of second electrodes 320. In the example of FIG. 4D, the first electrode 310 has a configuration that extends across a width of the heat generating pattern 110. That is, the first electrode 310 extends between side edges of the heat generating pattern 110. By extending the first electrode 310 across a width of the heat generating pattern 110, a current that is provided to the heat generating pattern 110 may be uniformly distributed across the width of the heat generating pattern 110. In that regard, the example configuration of the first electrode 310 illustrated in FIG. 4D is similar to the example of FIG. 4B. However, in the example of FIG. 4D, the first electrode 310 is located at an end of the heat generating pattern 110 such that a connector 400 is not provided between the first electrode 310 and the heat generating pattern 110. Based on the location of the first electrode 310 being at the end of the heat generating pattern 110, the flow of current between the first electrode 310 and the heat generating pattern 110 will not be interrupted by another electrode, such as the current interruption explained above with reference to FIG. 3B. Furthermore, because the first electrode 310 extends across the width of the top surface of the heat generating pattern 110, current from the first electrode 310 to the heat generating pattern 110 will be evenly distributed across a width of the heat generating pattern 110. Thus, in the example of FIG. 4D that does not include a connector 400, a current provided to the heat generating pattern 110 may be uniformly distributed across the width of the heat generating pattern 110 so as to reduce or eliminate errors in the fusing process without increasing cost.

Figure 5:
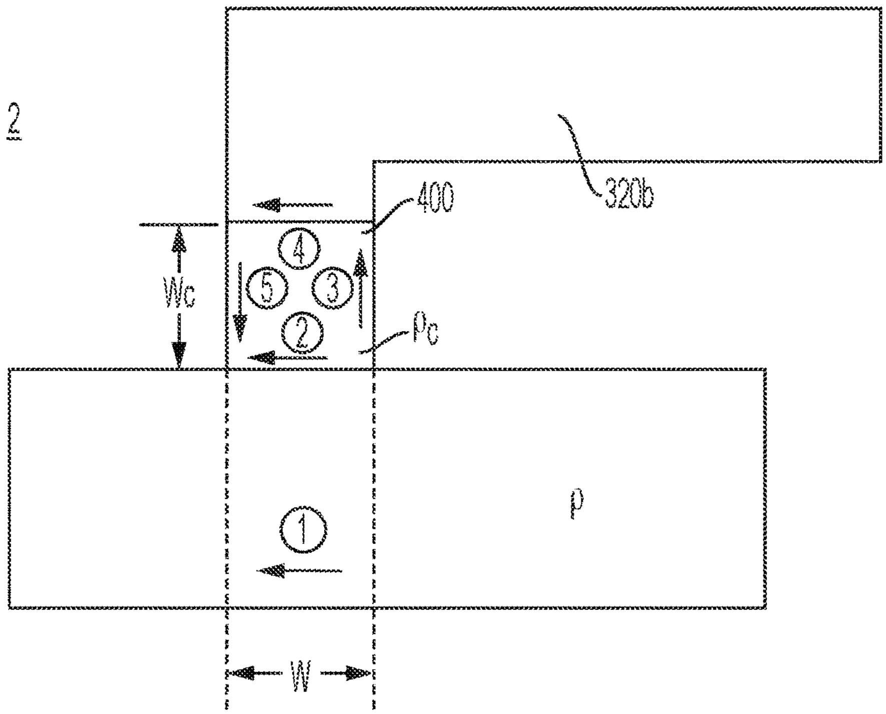
FIG. 5 illustrates current paths in a connector and a heat generating pattern.

FIG. 5 illustrates current paths in a connector and a heat generating pattern.

In FIG. 5, a heat generating pattern 110, a second electrode 320*b*, and a connector 400 are illustrated to describe different current paths that may be considered in selecting values of W, ρ, Wc, and $\rho_c$.

A first current path ① may be considered to be a desired current path to flow through the heat generating pattern 110 in order to generate heat. A second current path ② may be considered to be a first bypass current path (hereinafter "bypass1"). That is, as described above with reference to FIG. 3B, based on a resistance of bypass1 being less than a resistance of the first current path ①, current will flow through bypass1 rather than through the first current path ①. In a situation in which current flows through bypass1 rather than through the first current path ① (i.e., through bypass1 rather than a path intended for the heat generating pattern 110), uneven heating will result in the heat generating pattern 110 at an area corresponding to an interface of the connector 400 and the heat generating pattern 110.

A second bypass current path (hereinafter "bypass2") includes a third current path ③, a fourth current path ④, and a fifth current path ⑤. While bypass1 may occur in a heater that includes a connector 400 as well as a heater that does not include a connector 400, bypass2 will occur in a situation that includes a connector 400 but will not occur in a situation that does not include a connector 400. In other words, by including the connector 400, a resistance of both bypass1 and bypass2 are considered to ensure that current is maintained in the first current path ①.

To prevent current from flowing through bypass1, a resistance of the second current path ② is made greater than a resistance of the first current path ①. In that regard, it is seen that a length of the current path ① and a length of the current path ② are substantially the same. That is, the length of the first current path ① and the length of the second current path ② each has a length corresponding to a second dimension W, which in this example is a width of the second electrode 320*b*. In that case, based on estimating the resistance of the first current path ① as W×ρ, and the resistance of the second current path ② as W×$\rho_c$, current may be prevented from flowing through bypass1 by satisfying Equation 1:

$$W \times \rho_c > W \times \rho, \text{ or} \quad \text{Equation 1}$$

$$\rho_c > \rho$$

Accordingly, by selecting a material for the connector 400 to have a resistivity $\rho_c$ higher than a resistivity ρ of a material of the heat generating pattern 110, current may be prevented from flowing through bypass1.

In the example of FIG. 5, the connector 400 is shown having a substantially rectangular shape in which the side of the connector 400 that contacts the heat generating pattern 110 has a second dimension W that is the same width as the second electrode 320*b*. In other examples, the connector 400 may be located between the second electrode 320*b* and the heat generating pattern 110 but may have a second dimension W that is greater than or less than the width of the second electrode 320*b*. In that case, the second dimension W may be considered as a width of a contact interface between the connector 400 and the heat generating pattern 110. In other words, the second dimension W may be considered to be a length of contact from a most upstream contact point between the connector 400 and the heat generating pattern 110 to a most downstream contact point between the connector 400 and the heat generating pattern 110 in a direction of current flow. That is, the second dimension W may be considered as the distance between sides edges of the connector 400.

To prevent current from flowing through bypass2, a total resistance of the third current path ③+the fourth current path ④+the fifth current path ⑤ should be greater than the resistance of the first current path ① as well as greater than the resistance of the second current path (Z.

To result in a total resistance of ③+④+⑤ being greater than a resistance of ①, it may first be assumed that the resistance of ④ corresponds to a resistance of the second electrode 320*b*, which is a low resistance and may be ignored for this purpose. It may also be assumed that ③ and ⑤ share a similar path length of first dimension Wc, although in opposite directions. In that case, based on estimating the resistance of ① as W×ρ, and the resistance of ③ or ⑤ as Wc×$\rho_c$, current may be prevented from flowing though bypass2 by satisfying Equation 2:

$$((Wc \times \rho_c) + (Wc \times \rho_c)) > W \times \rho, \text{ or} \quad \text{Equation 2}$$

$$2(Wc \times \rho_c) > W \times \rho_c, \text{ or}$$

$$Wc \times \rho_c > 1/2\, W \times \rho$$

Accordingly, a resistivity $\rho_c$ of a material for the connector 400 and/or a first dimension Wc of the connector 400 as well as a second dimension W of the connector 400 and a resistivity ρ of a material for the heat generating pattern 110 may be selected to satisfy Equation 2. In that case, current will flow through the desired first current path ①.

To further prevent current from flowing through bypass2, a total resistance of ③+④+⑤ is to be greater than a resistance of ②. As noted above, a resistance of ③+④+⑤ may be estimated as 2(Wc×$\rho_c$) while a resistance of ② may be estimated as W×$\rho_c$. In that case, current may be prevented from flowing though bypass2 by satisfying Equation 3:

$$2(Wc \times \rho_c) > W \times \rho_c, \text{ or} \quad \text{Equation 3}$$

$$2Wc > W, \text{ or}$$

$$Wc > 1/2\, W$$

Accordingly, a size of the first dimension Wc or a size of the second dimension W of the connector 400 may be selected to satisfy Equation 3. In that case, current will flow through the desired first current path ①.

In the example of FIG. 5, the connector 400 is shown having a substantially rectangular shape in which the first dimension Wc of the connector 400 is constant between the heat generating pattern 110 and the second electrode 320*b*. However, in other examples, the connector 400 may have a discontinuous first dimension Wc between the heat generating pattern 110 and the second electrode 320*b*. In that case, for purposes of Equations 2 and 3, the first dimension Wc may be considered to be the shortest distance between the second electrode 320*b* and the heat generating pattern 110.

In various examples, a material composition of the connector 400 may be similar to a material composition of the heat generating pattern 110 but selected to have desired resistivities. For example, each of the connector 400 and the heat generating pattern 110 may include a first material and a second material that may include two or more of Au, Ag, Pd, Pt, Rh, or Ir. However, the ratios of the materials may be selected to result in a desired resistivity for the connector 400 and the heat generating pattern 110.

Figure 6:
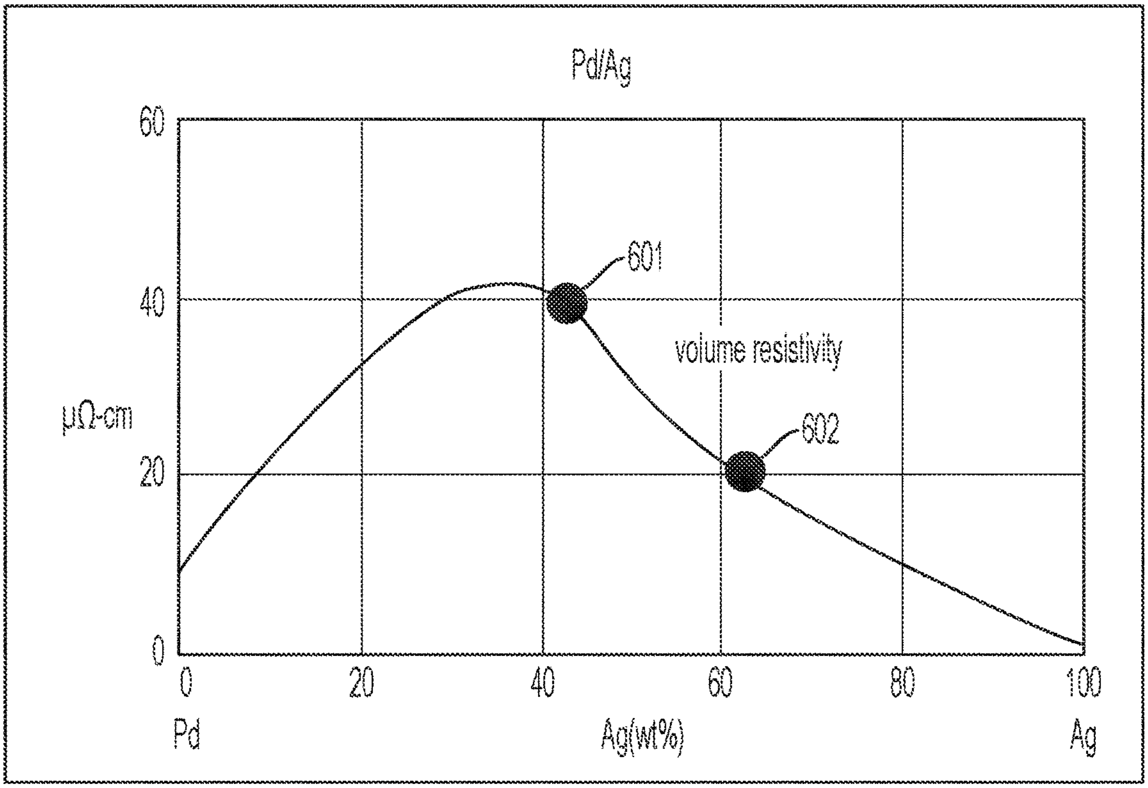
FIG. 6 is a graph showing an example of a resistivity of a material according to a composition of the material.

FIG. 6 is a graph showing an example of a resistivity of a material according to a composition of the material.

In various examples, a heat generating pattern and a connector may include different compositions of the same materials. As an example, the heat generating pattern may include a first material and a second material combined to have a first ratio, and the connector may include the first material and the second material combined to have a second ratio such that the second ratio results in a higher resistivity of the composition than the first ratio. The first material and the second material may include Au, Ag, Pd, Pt, Rh, or Ir.

The graph of FIG. 6 shows a resistivity of a PdAg material based on different compositions. As shown in FIG. 6, a composition having 0% Ag and 100% Pd has a resistivity of approximately 10 μΩ·cm whereas a composition having 0% Pd and 100% Ag has a resistivity of approximately 2 μΩ·cm. In an example, a composition of the connector 400 may have a ratio of approximately 40% Ag and 60% Pd, resulting in a resistivity 601 of approximately 40 μΩ·cm. A composition of the heat generating pattern 110 may have a ratio of approximately 60% Ag and 40% Pd, resulting in a resistivity 602 of approximately 20 μΩ·cm. As the resistivity $\rho_c$ of the connector 400 is greater than the resistivity ρ of the heat generating pattern 110, Equation 1 is satisfied such that current flowing through Bypass1 may be addressed. Moreover, based on these selected values of $\rho_c$ and $\rho$, values of W and Wc may be selected to satisfy Equations 2 and 3.

Of course, it is to be understood that the above-described ratios are merely an example and that other ratios, as well as other materials, may be selected to obtain the same result that $\rho_c > \rho$.

FIGS. 7A to 7D are top views illustrating various examples of a heater including a heat generating pattern, a first electrode, and a plurality of second electrodes, and selectively including a connector.

In FIGS. 7A to 7D, a description is made of a first electrode 310, a second electrode 320, a first contact 311, and a second contact 321. Each of the first electrode 310 and the second electrode 320 may include a low resistance material that is to supply electric power to the heat generating pattern 110. That is, the first electrode 310 and the second electrode 320 are to supply power to the heat generating pattern 110 with little to no power loss and thus little to no heat generation. In various examples, the first electrode 310 and the second electrode 320 may include a low resistance material such as Cu, Au, and the like. The first contact 311 and the second contact 321 are to provide a connection through which an external power source may supply power to the first electrode 310 and the second electrode 320. The first contact 311 and the second contact 321 may include a low resistance material such as Cu, Au, and the like.

Figure 7A:
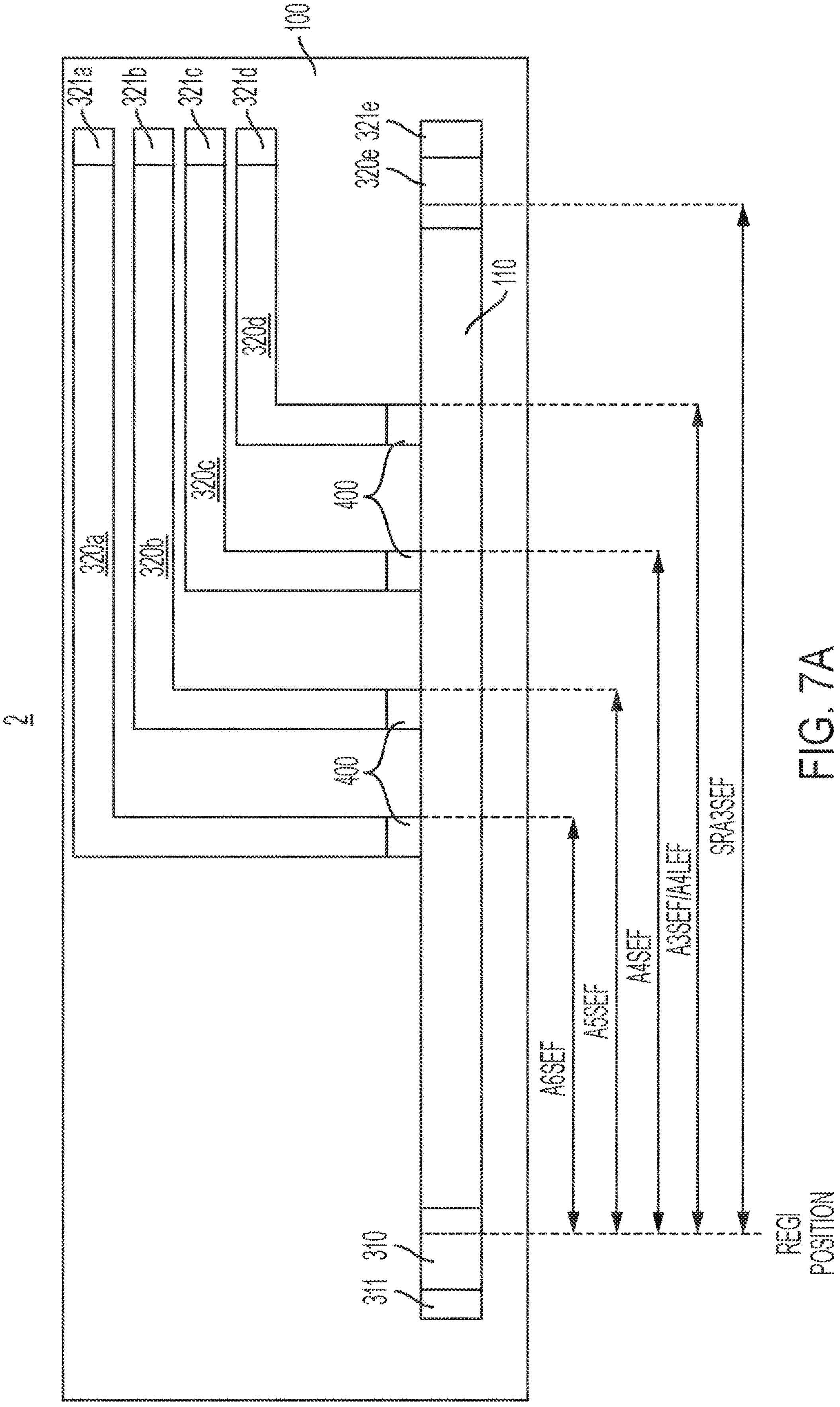
FIGS. 7A to 7D are top views illustrating various examples of a heater including a heat generating pattern, a first electrode, and a plurality of second electrodes, and selectively including a connector.

Referring to FIG. 7A, the heater 2 includes the substrate 100 having the heat generating pattern 110 located on a top surface of the substrate 100. The heater 2 includes a first electrode 310 located at a first end of the heat generating pattern 110 and a plurality of second electrodes 320*a*, 320*b*, 320*c*, 320*d*, and 320*e* located at an opposite end of the heat generating pattern 110. For convenience of description, the plurality of second electrodes may be referred to as 320. The heater 2 includes a first contact 311 electrically connected to the first electrode 310. The heater 2 also includes a plurality of second contacts 321*a*, 321*b*, 321*c*, 321*d*, and 321*e* that are electrically connected to the plurality of second electrodes 320*a*, 320*b*, 320*c*, 320*d*, and 320*e*, respectively. For convenience of description, the plurality of second contacts may be referred to as 321. In the example of FIG. 7A, a connector 400 is provided between the heat generating pattern 110 and each of the second electrodes 320*a*, 320*b*, 320*c*, and 320*d*. In the example of FIG. 7A, the first electrode 310 and the second electrode 320*e* are illustrated as not including a connector 400. As described above in the example of FIG. 4D, a connector 400 may not be provided in a case in which the electrode (e.g., 310 or 320*e*) extends across a top surface of the heat generating pattern 110 at an end of the heat generating pattern 110. Although not illustrated, a power source, a switch, and the like may also be included to provide power to the first contact 311 and the second contact 321.

In the example of FIG. 7A, the first end and the opposite end of the heat generating pattern 110 may be considered relative to a registration position (i.e., Regi Position, FIG. 7A). The plurality of second electrodes 320 are respectively spaced apart from the first electrode 310 at a plurality of distances. In more detail, the plurality of second electrodes 320 are respectively spaced apart from the first electrode 310 at a plurality of distances corresponding to different sizes of a printing medium. For example, a distance between the first electrode 310 and the second electrode 320*a* may correspond to a printing medium having an A6 short edge feed (SEF) size. A distance between the first electrode 310 and the second electrode 320*b* may correspond to a printing medium having an A5SEF size. A distance between the first electrode 310 and the second electrode 320*c* may correspond to a printing medium having an A4SEF size. A distance between the first electrode 310 and the second electrode 320*d* may correspond to a printing medium having an A3SEF or A4 long edge feed (LEF) size. And, a distance between the first electrode 310 and the second electrode 320*e* may correspond to a printing medium having a supplementary raw (SR) A3 SEF size. Of course, these sizes are merely examples and not to be construed as limiting. In other examples, a distance between the first electrode 310 and the second electrode 320 may correspond to a letter size, a legal size, or the like. Furthermore, while five sizes of printing media and corresponding distances have been described, this is not intended to be limiting in that more or fewer sizes and distances may be considered.

In the example of FIG. 7A, the first electrode 310 and the plurality of second electrodes 320 are arranged based on a registration ("Regi") position located on a left-most side of the heater 2. In that case, the first end and the opposite end of the heat generating pattern 110 may be considered relative to the registration position. Based on the configuration of the first electrode 310 and the plurality of second electrodes 320 in the example of FIG. 7A, the heater 2 is to be used in a fusing unit of an image forming apparatus that orients a printing operation based on an edge of a printing medium.

In the example of FIG. 7A, by including the connector 400 between the heat generating pattern 110 and each of the second electrodes 320*a*, 320*b*, 320*c*, and 320*d*, current flow may be maintained in the heat generating pattern 110 and bypass current paths may be prevented. For example, in a situation in which an SRA3SEF printing medium is to undergo a fusing process, volage may be applied to the first contact 311 and the second contact 321*e* such that current is to flow between the first electrode 310 and the second electrode 320*e* through the heat generating pattern 110. By including the connector 400 at the second electrodes 320*a*, 320*b*, 320*c*, and 320*d*, current may be prevented from flowing through bypass1 and bypass2.

Figure 7B:
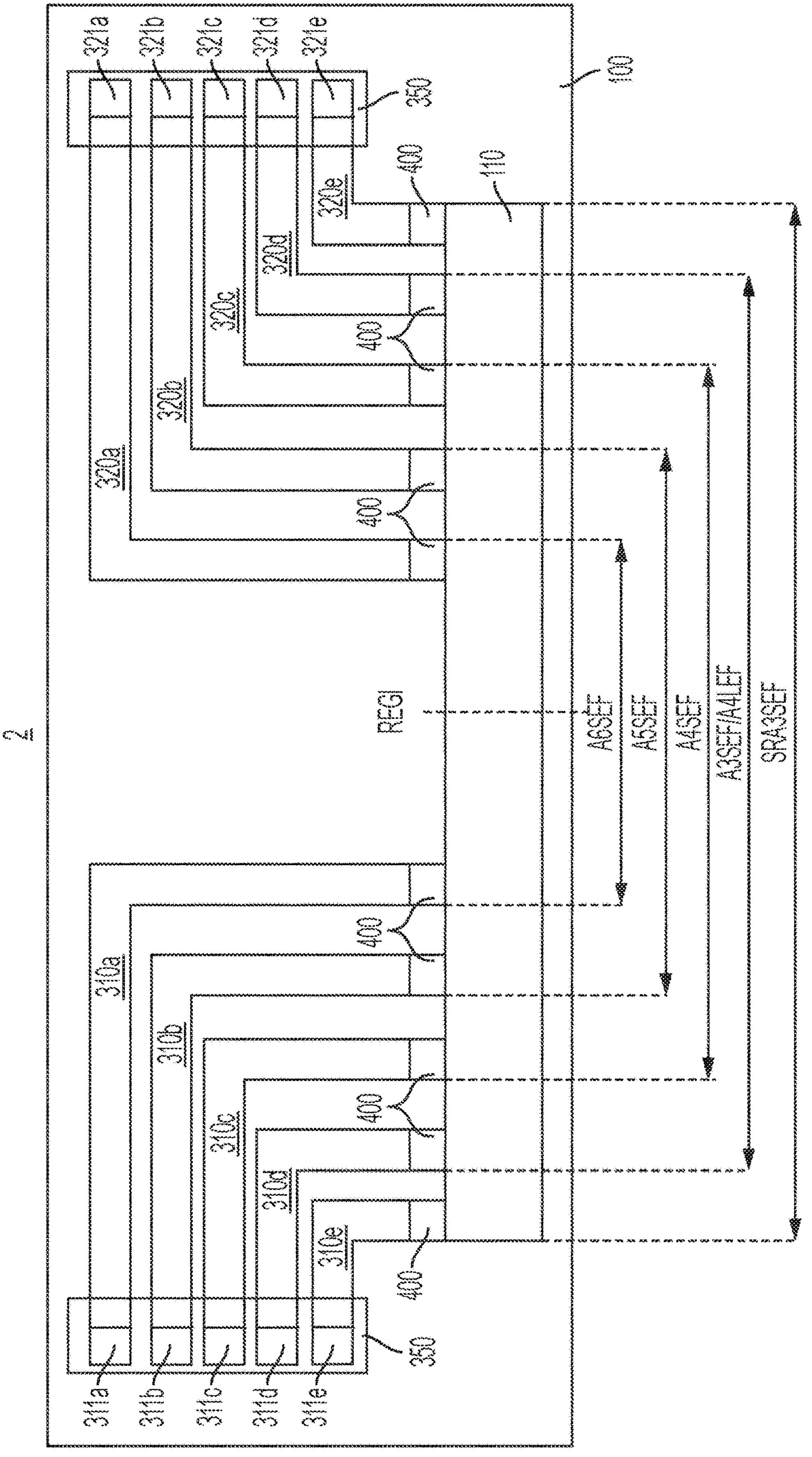

Referring to FIG. 7B, the heater 2 includes the substrate 100 having the heat generating pattern 110 located on a top surface of the substrate 100. In the example of FIG. 7B, a plurality of first electrodes 310 are provided that respectively correspond to the plurality of second electrodes 320. In more detail, a first electrode 310*a* corresponds to a second electrode 320*a*, a first electrode 310*b* corresponds to a second electrode 320*b*, a first electrode 310*c* corresponds to a second electrode 320*c*, a first electrode 310*d* corresponds to a second electrode 320*d*, and a first electrode 310*e* corresponds to a second electrode 320*e*.

The heater 2 also includes a plurality of first contacts 311*a*, 311*b*, 311*c*, 311*d*, and 311*e* respectively connected to the plurality of first electrodes 310*a*, 310*b*, 310*c*, 310*d*, and 310*e*. Similarly, the heater 2 includes second contacts 321 respectively connected to the second electrodes 320. The plurality of first contacts 311 may be contained within a first terminal 350 located at a first side of the heater 2. Also, the plurality of second contacts 321 may be contained within a second terminal 350 located at a second side of the heater 2. Each of the terminals 350 may provide a convenient electrical connection with a power source of a fusing unit or an image forming apparatus in which the heater 2 is located.

In the example of FIG. 7B, the registration position is located at a center of the heater 2 and the first end and the opposite end of the heat generating pattern 110 may be considered relative to the registration position. That is, the plurality of first electrodes 310 and the plurality of second electrodes 320 are arranged based on a registration position located at a center of the heater 2 wherein the plurality of first electrodes 310 are respectively spaced apart from the plurality of second electrodes 320 at distances corresponding to different sizes of a printing medium. Based on this arrangement, the heater 2 of the example of FIG. 7B, including the configuration of the plurality of first electrodes 310 and the plurality of second electrodes 320, is to be used in a fusing unit of an image forming apparatus that orients a printing operation based on a center of a printing medium.

The heater 2 of the example of FIG. 7B includes a connector 400 provided between the heat generating pattern 110 and each of the first electrodes 310 and each of the second electrodes 320. Although not illustrated, a power source, a switch, and the like may also be included to provide power the first contact 311 and the second contact 321.

Figure 7C:
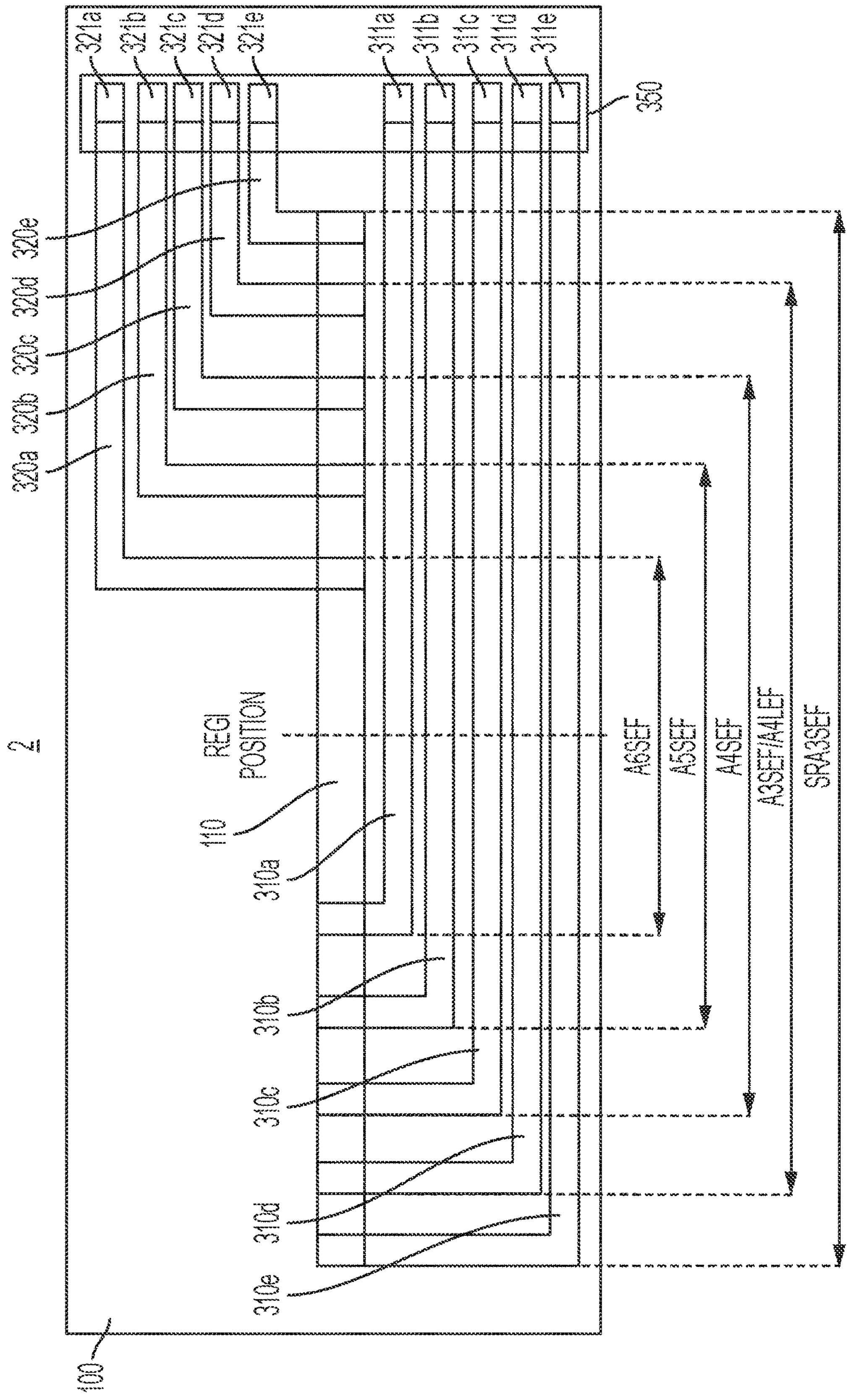

Referring to FIG. 7C, the heater 2 is similar to the heater 2 of FIG. 7B such that differences from the heater 2 illustrated in FIG. 7B will be described, and a duplicated description will not be repeated. In the example of FIG. 7C, a single terminal 350 is provided. In that case, the first contacts 311 and the second contacts 321 may be contained within the same terminal 350. Based on providing the single terminal 350 located at an end of the heater 2, the first electrodes 310 and the second electrodes 320 may be routed on opposite sides of the heat generating pattern 110. In that case, the heat generating pattern 110 may be located at or near a center of substrate 100. By using a single terminal 350, a cost of the heater 2 may be lowered and installation may be more convenient by having a single connection with a fusing unit or image forming apparatus.

In the example of FIG. 7C, the plurality of first electrodes 310 and the plurality of second electrodes 320 include a configuration that extends across a top surface of the heat generating pattern 110, which is similar to the example described above with respect to FIG. 4B. Although not seen in the top view of FIG. 7C, a connector 400 may be located between the heat generating pattern 110 and each of first electrodes 310 and the second electrodes 320. In another example, a connector 400 may be located between the heat generating pattern 110 and each of first electrodes 310*a*, 310*b*, 310*c*, and 310*d* as well as each the second electrodes 320*a*, 320*b*, 320*c*, and 320*d*. That is, based on the position of the first electrode 310*e* and the second electrode 320*e* at ends of the heat generating pattern 110, a connector 400 may not be provided.

In the example of FIG. 7C, based on the registration position located at the center of the heater 2, the plurality of first electrodes 310 are respectively spaced apart from the plurality of second electrodes 320 at distances corresponding to different sizes of a printing medium. Based on this arrangement, the heater 2 of the example of FIG. 7C, including the configuration of the plurality of first electrodes 310 and the plurality of second electrodes 320, is to be used in a fusing unit of an image forming apparatus that orients a printing operation based on a center of a printing medium.

Figure 7D:
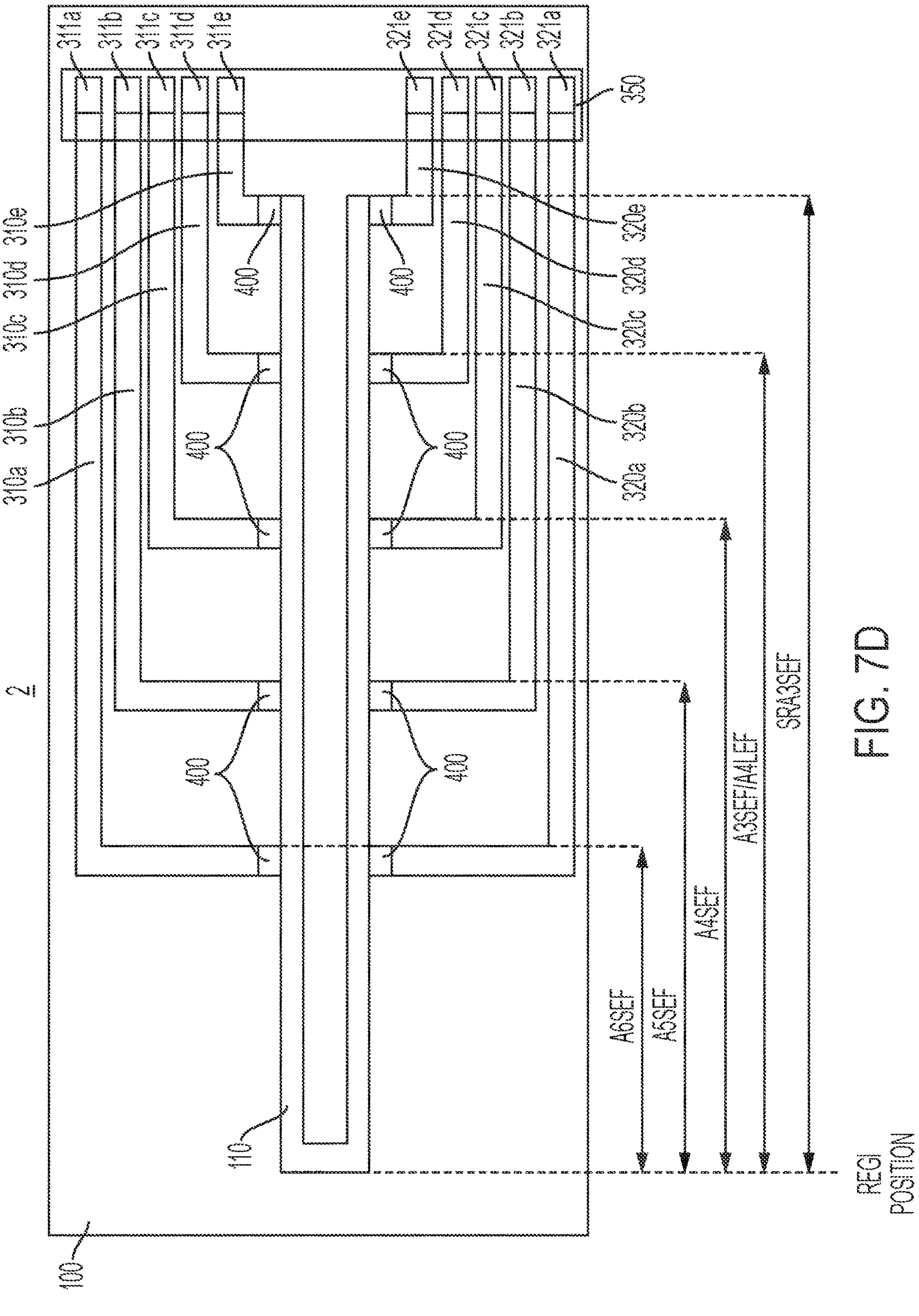

Referring to FIG. 7D, the heater 2 is similar to the heater 2 of FIGS. 7A and 7C such that differences will be described, and a duplicated description will not be repeated. In the example of FIG. 7D, the heat generating pattern 110 has a "U" shape with an opening facing a terminal 350. Based on this configuration of the heat generating pattern 110, an overall length of the first electrodes 310 and an overall length of the second electrodes 320 may be reduced, thus resulting in a lower manufacturing cost. In the example of FIG. 7D, the plurality of first electrodes 310 and the plurality of second electrodes 320 are arranged based on the registration position located on a left-most side of the heater 2. In that case, the heater 2 of the example of FIG. 7D is to be used in a fusing unit of an image forming apparatus that orients a printing operation based on an edge of a printing medium.

In FIGS. 7A to 7D, various example configurations of first and second electrodes are provided. However, these examples are not to be construed as limiting. That is, any of the first and second electrodes may include an arrangement and connection with the heat generating pattern such as those shown in FIGS. 4A to 4D. For example, although FIGS. 7A to 7D did not illustrate an example in which an electrode had a configuration similar to that illustrated in FIG. 4C, this is not to be construed as limiting.

Figure 8A:
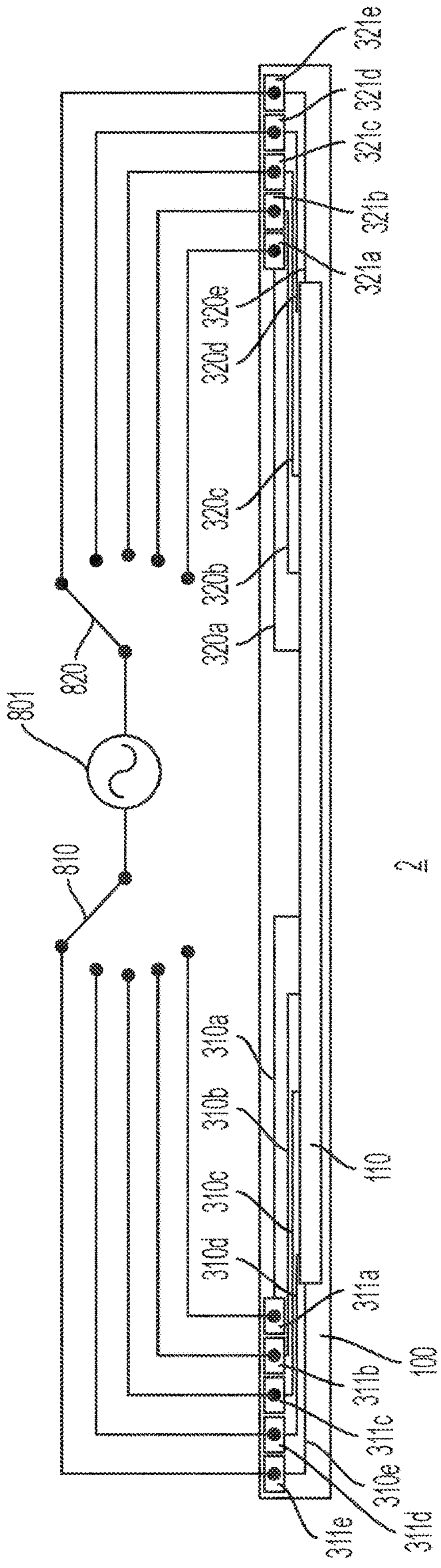
FIGS. 8A and 8B illustrate examples of a heater including a power source and a switch.
Figure 8B:
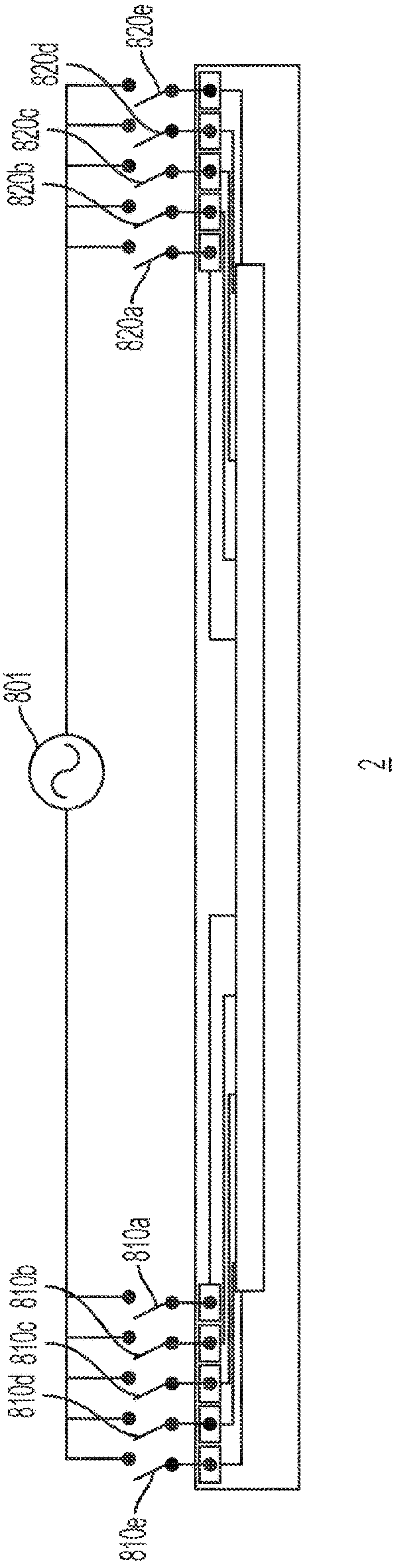

FIGS. 8A and 8B illustrate examples of a heater including a power source and a switch.

Referring to FIG. 8A, a heater 2 is similar to the heater 2 of FIG. 7B and further includes a power source 801, a first switch 810, and a second switch 820. Although not illustrated in FIG. 8A, the heater 2 further includes a controller (e.g., a processor) to control an operation of the first switch 810 and an operation of the second switch 820.

The first switch 810 may be implemented as a single pole, five-throw switch that may be operated to selectively provide a voltage from the power source 801 to one of the first contacts 311. The second switch 820 may similarly be implemented as a single pole, five-throw switch that may be operated to selectively provide a voltage from the power source 801 to one of the second contacts 321. In an example, each of the first switch 810 and the second switch 820 may be operated to provide a voltage from the power source 801 to a corresponding first and second contact, such as first contact 311*a* and second contact 321*a*. Of course, this is merely an example and each of the first switch 810 and second switch 820 may be selectively controlled to provide a voltage from the power source 801 to any of the first plurality of contacts 311 and the second plurality of contacts 321.

Referring to FIG. 8B, the heater 2 is similar to the heater 2 of FIG. 8A such that differences from the heater 2 illustrated in FIG. 8A will be described, and a duplicated description will not be repeated. The heater 2 of FIG. 8B includes the power source 801, the first switch 810, and the second switch 820. In the example of FIG. 8B, the first switch 810 may be implemented by a plurality of single pole, single throw switches that are respectively connected to the plurality of first contacts 311. Similarly, the second switch 820 may be implemented by a plurality of single pole, single throw switches that are respectively connected to the plurality of second contacts 321. In operation, a controller (e.g., a processor) may selectively operate the first switch 810 and the second switch 820 to selectively provide a voltage to the first contact 311 and the second contact 321. For example, the controller may identify a size of a printing medium, such as by a sensor or a user input, and control the first switch 810 and the second switch 820 to provide a voltage to the first contact 311 and the second contacts 321 that corresponds to the identified size of the printing medium.

By including a heater 2 according to an example as described above, a heating width of the heater 2 may be adjusted by controlling the first switch 810 and the second switch 820. In that case, it is possible to prevent a temperature rise in a non-feed area so that a cooling mechanism (e.g., a fan, a duct, a shutter, or the like) is not included and a device size and manufacturing cost may be reduced. Also, a paper feed interval may be maintained without being increased to address a temperature rise such that productivity is improved. Further, a heater 2 including a single heat generating pattern 110 may be monitored by a single temperature sensor and controlled by a single processor as opposed to multiple sensors and/or processors of comparative examples using multiple heat generating patterns. Still further, by including a connector between an electrode and a heat generating pattern, a bypass current path may be prevented to maintain a heating current within the heat generating pattern in a continuous manner.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A heater comprising:

a heat generating pattern provided on a substrate;

a first electrode located at a first end of the heat generating pattern;

a plurality of second electrodes located at an opposite end of the heat generating pattern, the plurality of second electrodes being respectively spaced apart from the first electrode at a plurality of distances; and a connector located between the heat generating pattern and the first or a second electrode, wherein the heat generating pattern includes a first ratio of a first material and a second material, and wherein the connector includes a second ratio of the first material and the second material, the second ratio having a higher resistivity than the first ratio.

2. The heater of claim 1, wherein the plurality of second electrodes are spaced apart from the first electrode at distances corresponding to different sizes of a printing medium.

3. The heater of claim 1, wherein the first electrode is one of a plurality of first electrodes located at the first end and respectively corresponding to the plurality of second electrodes, wherein the plurality of first electrodes are respectively spaced apart from the plurality of second electrodes at distances corresponding to different sizes of a printing medium.

4. The heater of claim 1, wherein the first electrode or a one of the plurality of second electrodes is connected to a side edge of the heat generating pattern, extends between a first side edge and a second side edge of a top surface, or covers the first and second side edges and extends between the first and second side edges of the top surface.

5. The heater of claim 1, wherein the connector provides a path having a higher resistance as compared to a path in the heat generating pattern.

6. The heater of claim 5, wherein, at an interface of the connector and the heat generating pattern, a resistance of an electrical path having a first length between side edges of the connector is greater than a resistance of an electrical path of the heat generating pattern having the first length.

7. The heater of claim 6, wherein a resistance of an electrical path from the heat generating pattern to the first or second electrode through the connector and returning from the first or second electrode through the connector to the heat generating pattern is greater than the resistance of the electrical path of the heat generating pattern having the first length.

8. The heater of claim 1, wherein the connector and the heat generating pattern satisfy the equation:

$$\rho_c > \rho,$$

wherein $\rho$ is a resistivity of the heat generating pattern and $\rho_c$ is a resistivity of the connector.

9. The heater of claim 8, wherein the connector and the heat generating pattern further satisfy the equation:

$$Wc \times \rho_c > 1/2\ W \times \rho$$

wherein W is a width of an interface between the connector and the heat generating pattern and Wc is a shortest distance between the first or second electrode and the heat generating pattern through the connector.

10. The heater of claim 8, wherein the connector and the heat generating pattern further satisfy the equation:

$$Wc > 1/2\ W$$

wherein W is a width of an interface between the connector and the heat generating pattern and Wc is a shortest distance between the first or second electrode and the heat generating pattern through the connector.

11. The heater of claim 1, further comprising:

a power source; and a switch to selectively apply power from the power source to the first electrode and one of the plurality of second electrodes.

12. A fusing unit comprising:

a flexible fusing belt;

a backup member located outside the fusing belt to form a fusing nip with the fusing belt; and a heater to heat the fusing belt at the fusing nip, wherein the heater comprises:

a heat generating pattern provided on a substrate;

a first electrode connected to the heat generating pattern;

a plurality of second electrodes connected to the heat generating pattern, the plurality of second electrodes being spaced apart corresponding to different sizes of paper; and a connector provided between the heat generating pattern and the first or a second electrode, wherein the heat generating pattern includes a first ratio of a first material and a second material, and wherein the connector includes a second ratio of the first material and the second material, the second ratio having a higher resistivity than the first ratio.

13. The fusing unit of claim 12, wherein the connector provides a path having a higher resistance as compared to a path in the heat generating pattern.

14. An image forming apparatus comprising:

an image forming unit to transfer a toner image to a print medium; and a fusing unit to fuse the toner image on the print medium by heating and pressing the print medium to which the toner image is transferred, wherein the fusing unit comprises:

a flexible fusing belt;

a backup member located outside the fusing belt to form a fusing nip with the fusing belt; and a heater to heat the fusing belt at the fusing nip, wherein the heater comprises:

a heat generating pattern provided on a substrate;

a first electrode connected to the heat generating pattern;

a plurality of second electrodes connected to the heat generating pattern, the plurality of second electrodes being spaced apart corresponding to different sizes of paper; and a connector provided between the heat generating pattern and the first or a second electrode, wherein the heat generating pattern includes a first ratio of a first material and a second material, and wherein the connector includes a second ratio of the first material and the second material, the second ratio having a higher resistivity than the first ratio.

* * * * *